United States Patent [19]
Persson

[11] 3,944,308
[45] Mar. 16, 1976

[54] FRAME FOR SUPPORTING ARTICLES

[75] Inventor: Eric Sigfrid Persson, Horby, Sweden

[73] Assignee: Expo Nord AB, Horby, Sweden

[22] Filed: July 23, 1974

[21] Appl. No.: 490,931

[30] Foreign Application Priority Data
Aug. 17, 1973 Sweden............................ 7311226
Jan. 21, 1974 Sweden............................ 7400717

[52] U.S. Cl.............. 312/111; 108/156; 312/257 R
[51] Int. Cl.²...................... F16B 12/00; A47B 3/06
[58] Field of Search............ 297/440; 312/108, 111, 312/257 SK, 257 A, 257 SM, 257 R, 111; 108/156, 157, 158, 159

[56] References Cited
UNITED STATES PATENTS

| | | | |
|---|---|---|---|
| 2,474,318 | 6/1949 | Molla | 108/158 |
| 3,059,983 | 10/1962 | Strom | 312/257 R |
| 3,233,942 | 2/1966 | Creutz | 297/440 |
| 3,439,466 | 4/1969 | Schreyer | 312/257 R X |
| 3,443,530 | 5/1969 | Carlson | 108/156 |
| 3,533,586 | 10/1970 | Chichester | 108/156 UX |
| 3,645,036 | 2/1972 | Biesterfeld et al. | 297/440 X |

FOREIGN PATENTS OR APPLICATIONS

| | | | |
|---|---|---|---|
| 92,181 | 11/1961 | Denmark | 312/111 |
| 1,255,448 | 1/1961 | France | 312/111 |
| 1,513,248 | 1/1968 | France | 108/158 |

*Primary Examiner*—Donald A. Griffin

[57] ABSTRACT

A frame for supporting articles comprises a plurality of bars which have angularly bent longitudinal portions and make angles with each other, some of the longitudinal portions extending in contiguous relation and being locked together by locking means engaging the channels in the bars.

10 Claims, 25 Drawing Figures

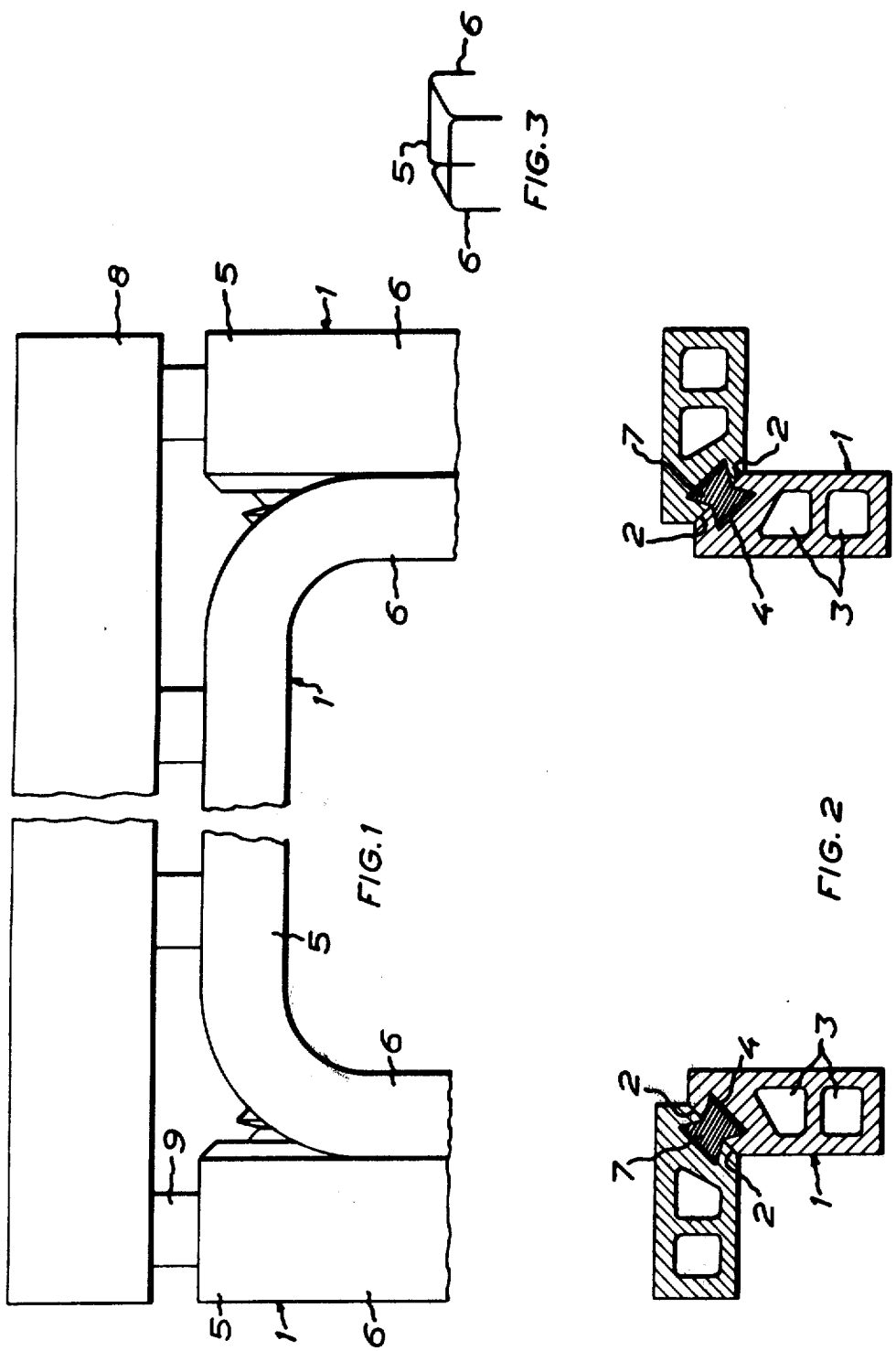

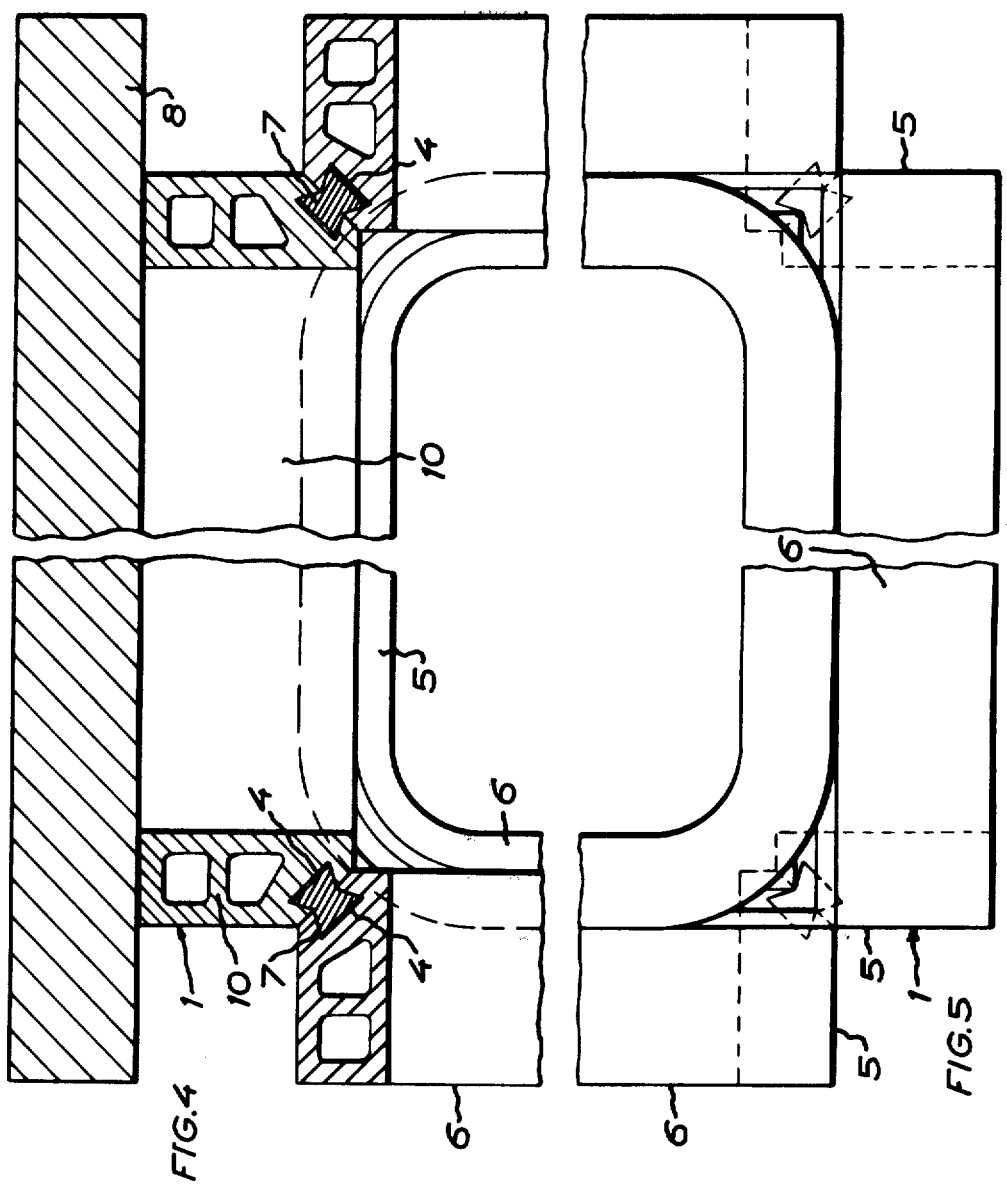
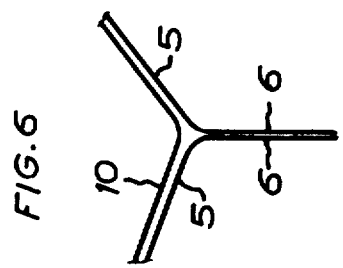

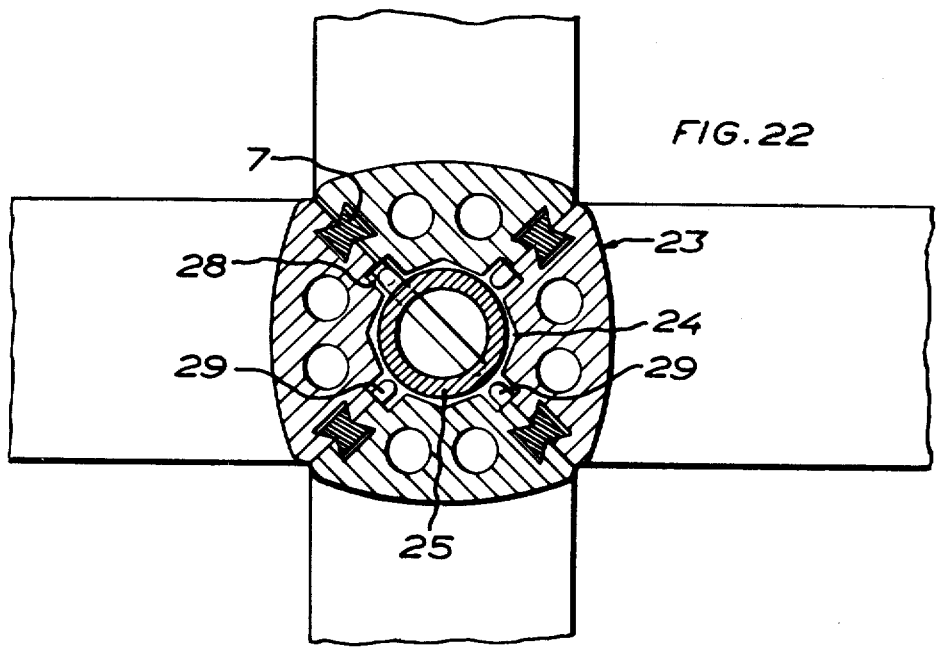
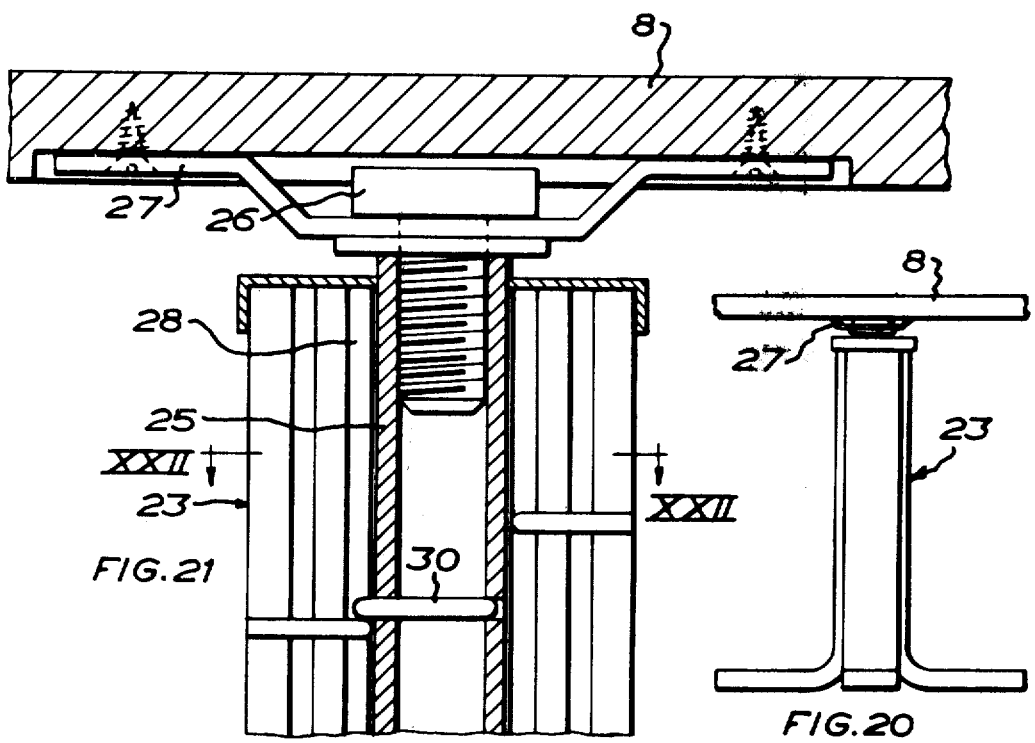

FRAME FOR SUPPORTING ARTICLES

This invention relates to a frame for supporting articles, such as table tops, seats, cabinets, television apparatuses etc. The frame is of the type comprising a plurality of bars which have angularly bent longitudinal portions and make angles with each other, some of said portions extending in contiguous relation and being interconnected.

Various problems are met with in the manufacture of frames of the aforementioned type, particularly with regard to the interconnection of those portions of the frame bars which extend in contiguous relation. It is customary to bring about the interconnection by welding or by winding strips of material around the contiguous bar portions, but such an interconnection must be carried out by the manufacturer of the frame so that the frame has to be dispatched in its finished bulky condition. Such an interconnection is difficult, expensive and involves high transportation costs for the frame. It is also known to interconnect the contiguous bar portions by screwed connections. It is true that these screwed connections can be designed in such a way that the frame can be dispatched in a dismounted state, which will reduce the transportation costs, but the screwed connections are expensive in manufacture, particularly when they shall be designed in such a way to make it possible for the customer himself to assemble the frame, and moreover, the screwed connections are often less pleasing in aesthetical respect.

The present invention has been developed to eliminate the above mentioned disadvantages which are inherent in the prior art frames of the aforementioned type. To this end, each bar has a channel which extends throughout the length thereof and is formed with a constricted channel side opening which opens into a side surface of the bar, and each pair of the contiguously extending bar portions turn their channel side openings towards each other and are interconnected by the intermediary of locking means detachably introduced into the channels of the said two portions and engaging therein under locking action, said locking means extending through the channel side openings from channel to channel.

The frame according to the invention is easily and inexpensively manufactured, can be dispatched in dismounted state at low transportation costs since it can readily be assembled by the customer, and permits an interconnection of the frame bars which is invisible from outside.

Embodiments of the invention will be more fully described hereinbelow and with reference to the accompanying drawings in which:

FIG. 1 is a side elevation of the upper portion of a frame with a table top arranged thereon;

FIG. 2 is a horizontal section of two of the legs of the frame illustrated in FIG. 1;

FIG. 3 is a diagrammatic perspective view of the frame in FIGS. 1 and 2 with the table top removed;

FIGS. 4–6 are views of a modification of the frame shown in FIGS. 1-3, FIG. 4 being a central vertical section of the frame, FIG. 5 a top plan view of the frame with the table top removed, and FIG. 6 a diagrammatic perspective view of a corner portion of the frame;

Figure 9:
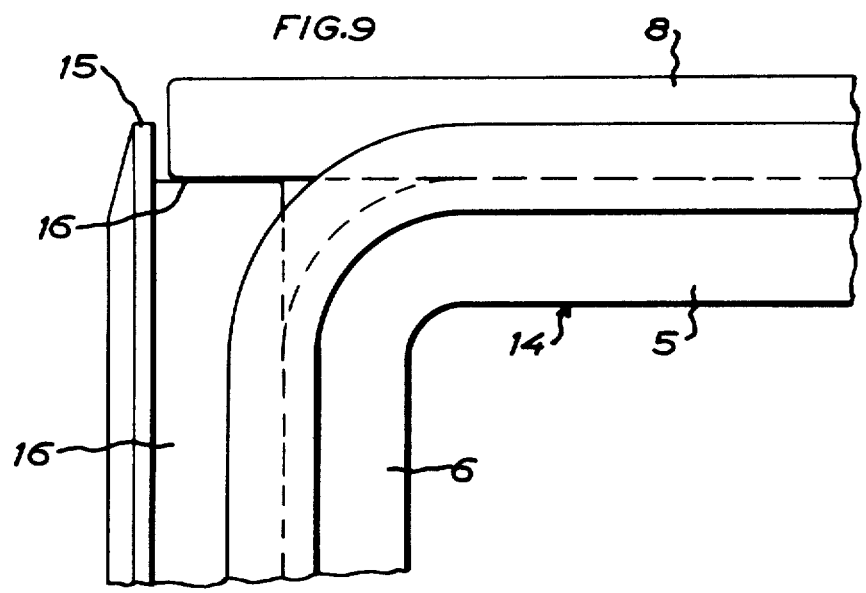
FIG. 9 is a side elevation of a corner portion of a table frame.
Figure 10:
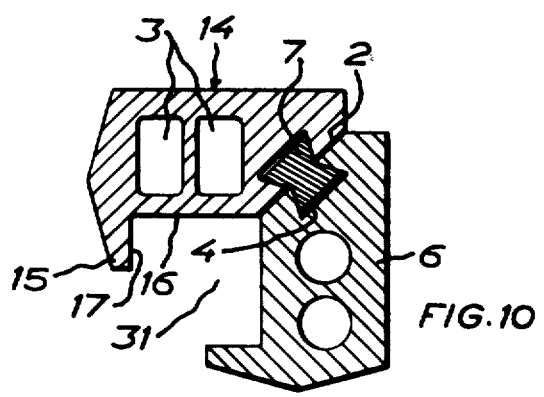
FIG. 10 is a horizontal section of one of the legs of the frame shown in FIG. 9.
Figure 11:
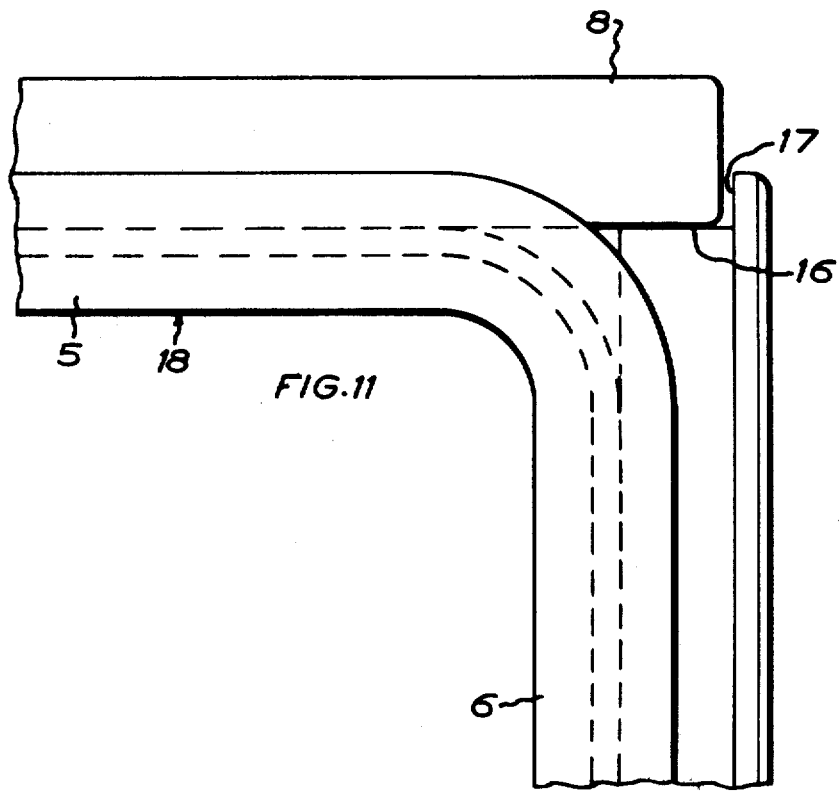
Figure 12:
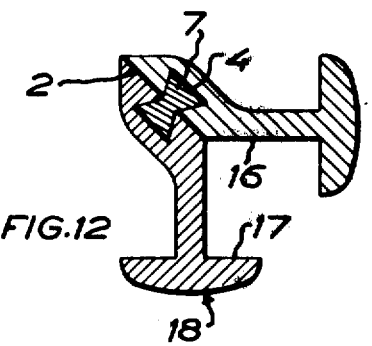
Figure 13:
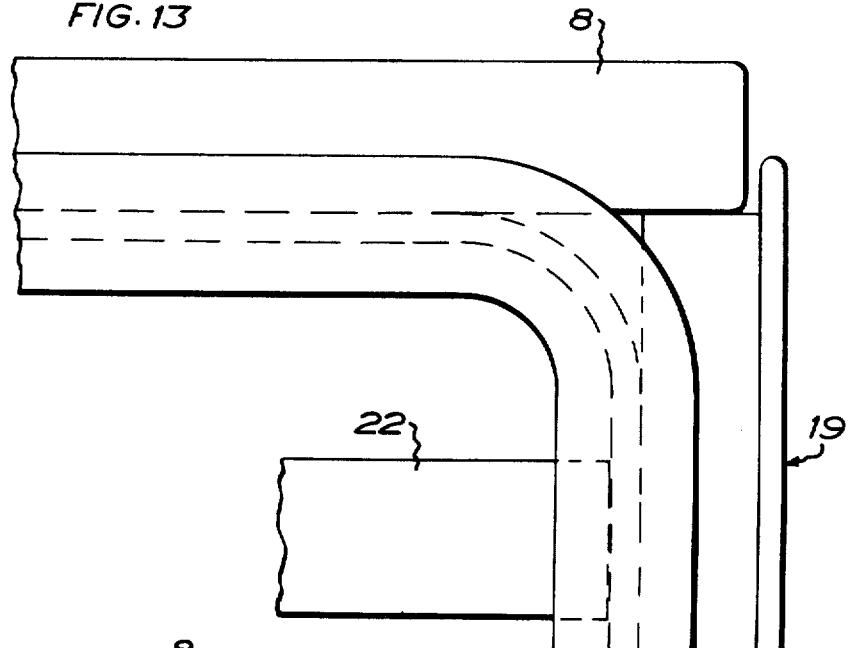
Figure 14:
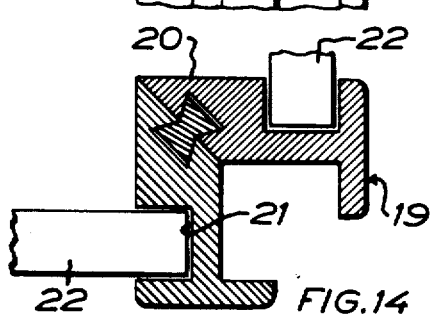
Figure 15:
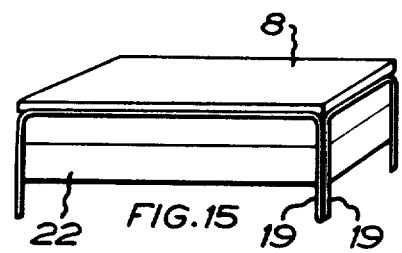
Figure 16:
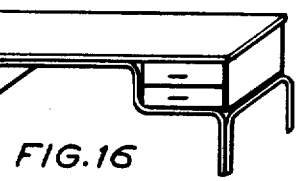

FIGS. 11 and 12 in the same way as FIGS. 9 and 10, respectively, show another embodiment of a table frame;

FIGS. 13 and 14 in the same way as FIGS. 9 and 10, respectively, show a further modification of a table frame;

FIG. 15 is a diagrammatic perspective view of a table having a frame of the type shown in FIGS. 13 and 14;

FIGS. 16–19 are diagrammatic views of various embodiments of frames;

FIG. 20 is a side elevation of a table comprising a pedestal frame;

FIG. 21 on a larger scale and partly in section shows a portion of the table in FIG. 20;

FIG. 22 is a section on the line XXII—XXII in FIG. 21.

Figure 23:
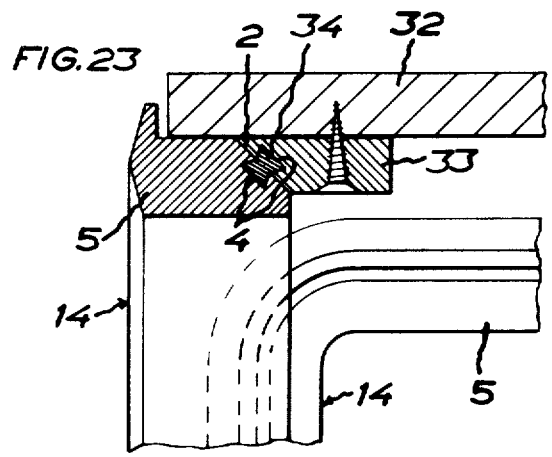
Figure 24:
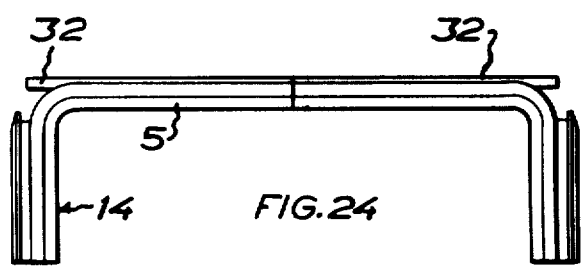
Figure 25:
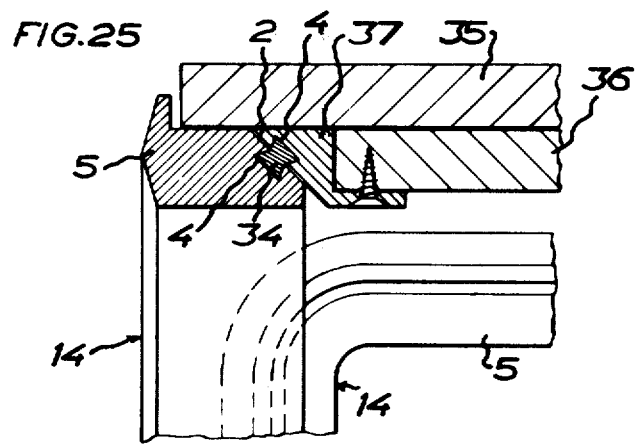

FIG. 23 is a section, corresponding to FIG. 9, of a modification of the table shown in FIG. 9;

FIG. 24 is a side elevation, on a small scale, of a table according to FIG. 23;

FIG. 25 is a section corresponding to FIG. 23, but showing a further modification of the table according to FIG. 9.

The table frame illustrated in FIGS. 1–3 comprises four identical bars 1 having the cross sectional shape of a rectangle from which one corner has been cut away at a 45° angle for the formation of an oblique surface 2. The bars have internal material-saving channels 3. Throughout the length of each bar there also extends a channel 4 which has a constricted channel side opening which opens into the oblique surface 2.

Each bar 1 is bent into the shape of a U having a web portion 5 and two limb end portions 6. The U-shaped bars are assembled in such a way that their web portions 5 extend horizontally and their limb end portions 6 extend vertically downward from the web portions and engage one another in pairs by means of their oblique surfaces 2 so that the mouths of the channels 4 are in facing relation. The U-shaped bars are interconnected in this assembled state by the intermediary of locking means 7. Each of these locking means is in the form of a rod having approximately hourglass cross section, and each half of the hourglass is of a shape conforming to the channel 4 in the frame bars 1. The interconnection of the U-shaped bars is established by detachably inserting a locking means 7 into the two facing channels 4 in each frame leg which is formed by two contiguously extending limb end portions 6 of the U-shaped bar. The locking means 7 is readily inserted in the channels 4 from the lower leg end so that the locking means lockingly engages the two channels 4 and extends through the channel side openings from channel to channel.

On the resulting frame, which is diagrammatically shown in FIG. 3, there can be mounted a table top 8 (FIG. 1), fixed to the horizontal web portions 5 of the bar 1 by appropriate fastening means 9 of optional kind. On a frame according to FIG. 3 there can be mounted, instead of a table top 8, for instance a seat to provide a stool, or a seat with back rest member to provide a chair.

FIGS. 4–6 illustrate a modification of the frame in FIGS. 1–3. The frame is composed of frame bars 1 of the same kind as in FIGS. 1–3. Four frame bars are bent into the shape of a U having a web portion 5 and limb end portions 6 in the same way as in the embodiment illustrated in FIGS. 1–3, and the limb end portions 6 of the U-shaped bars are also interconnected in pairs with the aid of locking means in the manner described in the foregoing. As distinct from the embodiment illustrated in FIGS. 1–3 the embodiment according to FIGS. 4–6 includes a further frame bar 1 bent to the shape of a ring 10 which extends along the horizontal web portions 5 of the U-shaped bars and is interconnected with them by the intermediary of locking means 7. The locking means 7 may be made of elastic material to permit being inserted in the facing channels 4 formed in the web portions 5 and the ring 10. If the locking means 7 are made of dimensionally stable material recesses can be formed in the side walls of the channels 4 in the web portions 5 and the ring 10 at suitable points for the formation of insertion openings for the locking means 7.

For instance, a table top 8 can be attached in a suitable manner on top of the ring 10.

Figure 7:
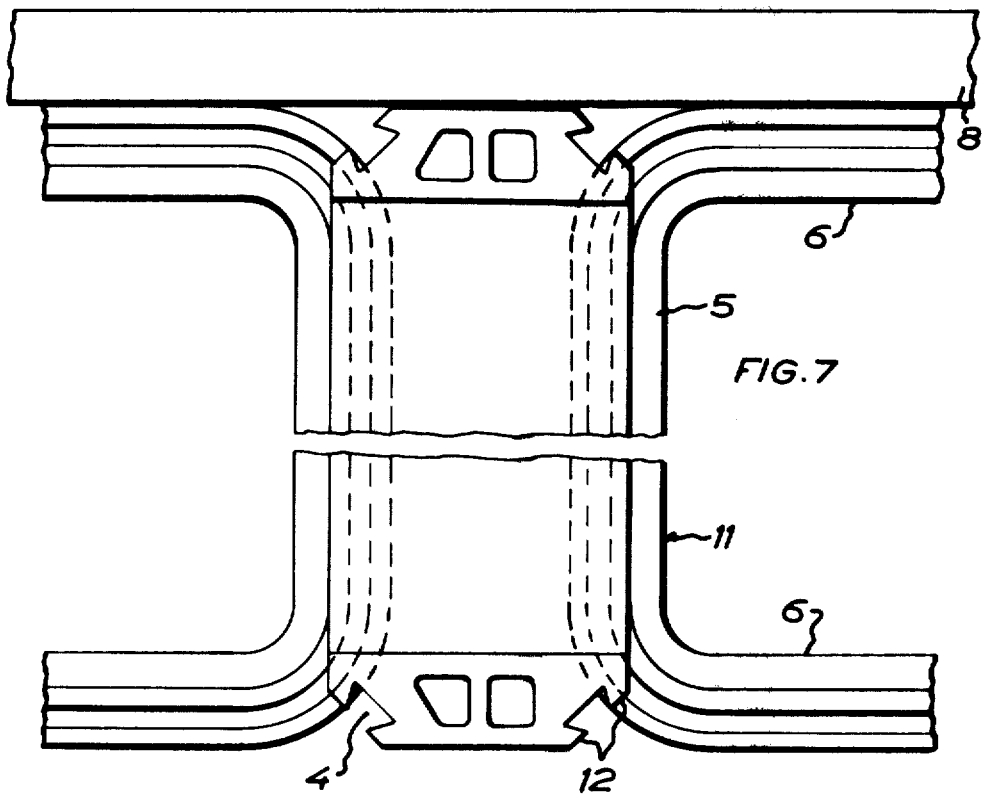
FIG. 7 is a side elevation of an embodiment of the frame designed as a pedestal for supporting a table top.
Figure 8:
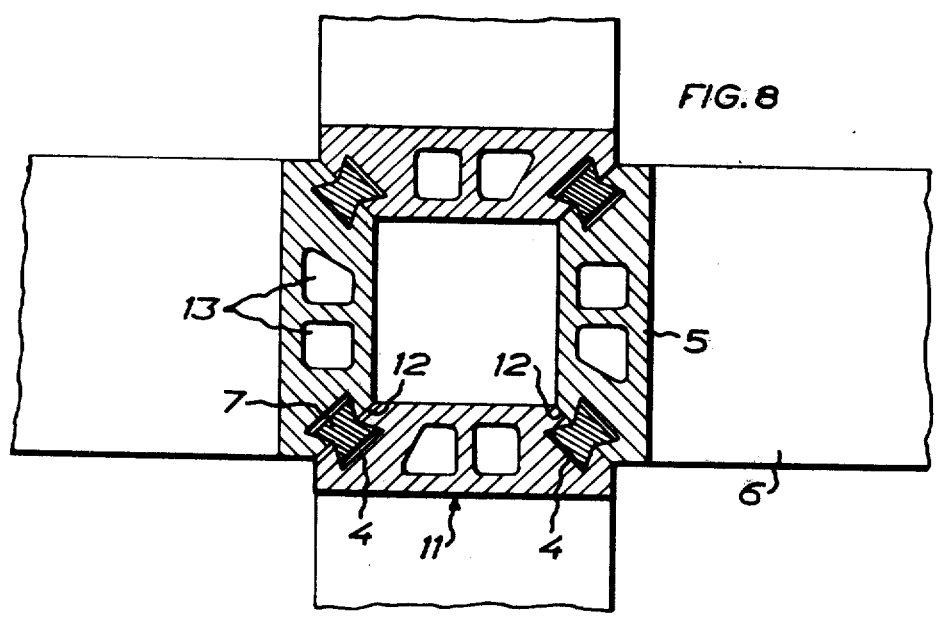
FIG. 8 is a horizontal section of the frame pedestal.

In FIGS. 7 and 8, use is made of frame bars 11 which in cross section are in the form of a rectangle in which two corner portions have been cut away at a 45° angle so that oblique surfaces 12 are formed. The frame bars contain material-saving channels 13. Moreover, the bars 11 in conjunction with each oblique surface 12 have one channel 4 extending throughout the length of the respective bar and formed with a constricted channel side opening which opens into the oblique surface 12. The bars 11 are bent into the shape of a U having a web portion 5 and limb end portions 6. The web portions 5 are contiguously assembled in square arrangement and interconnected in pairs by the intermediary of locking means 7 inserted into the channels 4, in the manner already described, so that the web portions 5 will constitute a pedestal which can be placed on a base by means of the limb end portions 6 protruding from the lower end of the pedestal. A table top 8 is mounted with the aid of suitable fastening means (not shown) on the other limb end portions 6 which protrude in different directions from the upper end of the pedestal.

The table frame illustrated in FIGS. 9 and 10 agrees with that of FIGS. 1–3, except for the frame bars 14 which have a slightly different cross sectional shape. Same as in FIGS. 1–3, each frame bar 14 in cross section has approximately the shape of a rectangle from which a corner portion has been cut away at a 45° angle so that an oblique surface 2 is formed, but at the end of the rectangle facing away from the oblique surface 2 there is provided a laterally extending flange 15, in the embodiment according to FIGS. 9 and 10. The frame bars 14 present material-saving channels 3 and a channel 4 which extends throughout the length of the bars, opens by means of a constricted channel side opening into the oblique surface 2 and serves to accommodate locking means 7. Same as in FIGS. 1–3, the bars 14 are bent into the shape of a U having a horizontal web portion 5 and limb end portions 6 directed vertically downwardly from said web portion.

By reason of the described cross sectional form and the U-shape 5, 6 of the frame bars 14, each U-shaped bar will have a side surface 16 oriented at right angles to the plane of the U-shaped bar and facing outwardly from said bar. On the one side said side surface 16 adjoins the oblique surface 2 and on the other side it ajoins a bar side surface 17 which from said oblique surface 2 projects approximately at right angles away from the U-shaped bar and constitutes one side wall of the flange 15.

As will best be seen from FIG. 9, the flanges 15 of the bars 14 will be directed upwardly within the horizontal web portions 5 of the U-shaped bars so that for instance a table top 8 can be arranged on the surface 16 of the web portions and be retained between the upwardly directed portions of the flanges 15.

Besides — as will best be seen from FIG. 10 — the side surfaces 17 of the flanges 15 and the surfaces 16 of two interconnected limbs of two U-shaped bars in the frame will together form a recess or an open channel 31 extending along the limbs. Said recess or channel 31 can be utilized as a framing or bracket for an appliance such as a lighting apparatus, a telephone support or the like.

FIGS. 11 and 12 show a frame which corresponds to that of FIGS. 9 and 10, with the exception that the frame bars 18 have been given another cross sectional shape. Thus, the frame bars 18 in FIGS. 11 and 12 have the cross sectional shape of a T the stem of which is bent at an angle of 45° at the free end to form an oblique surface 2, and in conjunction with said surface there is provided a channel 4 for locking means 7. Same as in FIGS. 9 and 10, the bars 18 are bent into the shape of a U having a horizontal web portion 5 and vertical limb end portions 6. By reason of the cross sectional shape described of the bars 18 and their U-shape each frame bar will have a side surface 16 which is at right angles to the plane of the U-shaped bar and faces outwardly from said bar. On the one side said side surface 16 adjoins the oblique surface 2 and on the other side it adjoins a bar side surface 17 which from said oblique surface projects approximately at right angles away from the U-shaped bar in order laterally to define a table top 8 placed on the web portions of the U-shaped bars.

FIGS. 13–15 show a table frame which substantially agrees with the frame of FIGS. 9 and 10. Apart from lacking material-saving channels 13, the U-shaped bars 19 differ from the bars 14 of FIGS. 9 and 10 only in that they present a groove 21 which is formed in a lateral surface 20 facing inwardly of the U-shaped bar and is open towards the interior of said U-shaped bar. Same as in FIGS. 9 and 10 a table top 8 is arranged on the horizontal web portions of the U-shaped bars 19, and in FIGS. 13 and 15 panels 22 are besides inserted in the grooves 21 of the U-shaped bars between the limbs thereof.

Figure 17:
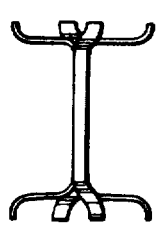
Figure 18:
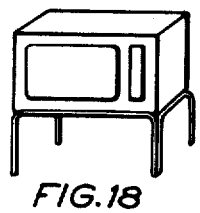
Figure 19:
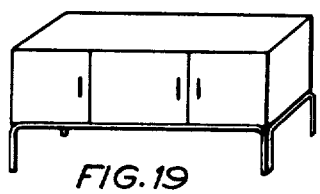

As shown by way of example in FIGS. 18 and 19, the table top 8 illustrated in the embodiments according to FIGS. 1–6 and 9–12 can be replaced by a television apparatus or a cabinet. It is diagrammatically shown in FIG. 16 how the U-shaped bars can be modified in order to carry for instance the table top of a desk and the associated pedestals of drawers thereof. FIG. 17 shows how frame bars, designed and interconnected substantially as in FIGS. 7 and 8, can be shaped into a coat hanger.

FIGS. 20–22 show a frame which has been designed as a pedestal provided with feet and adapted to carry a table top in a vertically adjustable manner. In FIGS. 20–22, each frame bar 23 is bent into L-shape and the bars are interconnected at their one L-arms with the aid of locking means 7 to form a pedestal, while the other L-arms of the bars protrude in different directions from the lower end of the pedestal to form the feet of said pedestal.

The bars 23 are of the cross sectional shape illustrated in FIG. 22. In the state in which they are interconnected by the intermediary of the locking means the bars will thus enclose, within the pedestal section of the frame, a substantially cylindrical central channel 24. A tube 25 is slidable and rotatable in the channel of the pedestal. A holder plate 27 is secured by means of a screw 26 to the upper end of the tube 25, and a table top 8 is secured to said holder plate 27. Furthermore, the cross sectional shape of the bars 23 is such that within the pedestal portion said bars form four longitudinal grooves 28 in the pedestal channel 24. A pin 29 secured to the bars 23 projects into each of the grooves 28. The four pins 29 are located at different levels. A pin 30 is secured to the tube 25 and one end of said pin enters one of the grooves 28 and rests on top of the pin 29 located in said groove. By raising the table top 8 with the tube 25 so far that the pin 30 will be above the pedestal, then turning the table top with the tube 25 and subsequently lowering the table top and the tube, the pin 30 will be introduced into some of the other grooves 28. At the lowering of the table top the pin 30 will come to rest on the pin 29 located in the respective groove 28. By this arrangement the table top 8 can thus be set at four different levels.

The construction of the table illustrated for instance in FIGS. 9 and 10 can readily be modified so as to accommodate one or more sliding table-top leaves, as shown in FIGS. 23 and 24. The table illustrated in FIG. 24 has a table top composed of two leaves 32. Each leaf 32 is slidably mounted on the frame which is formed by bars 14. To this end, two parallel bars 33 (only one is visible in FIG. 23) having an oblique surface 2 with a channel 4 of the kind earlier described, are fastened to the underside of each table-top leaf 32 near two opposed edges thereof. The channels 4 of the bars 33 are situated opposite the channels 4 in the web portions 5 of two opposed parallel U-shaped bars. Retaining means 34 similar to the locking means 7 earlier described is fastened in the channel 4 of each bar 33 and slidable in the channel 4 formed in the web 5 of the adjoining frame bar 14. The web portions 5 of the two U-shaped bars supporting the table-top leaves 32 are at a higher level than the web portions 5 of the other two U-shaped bars, as will appear from FIG. 23, so that the last-mentioned web portions do not impede the sliding movement of the table-top leaves 32.

According to FIG. 25, the construction of the table illustrated in FIGS. 23 and 24 can be modified in such a way that a table-top 35 is fastened to the web portions 5 situated at a higher level, while a pull-out leaf 36 is slidably mounted on said web portions beneath the table top 35. Two bars 37 are screwed to two opposed edges of the pull-out leaf 36 and have an oblique surface 2 with a channel 4 in which is fastened a retaining means 34 which slidably engages the channel 4 formed in the adjoining web portion 5.

What I claim and desire to secure by Letters Patent is:

1. A frame for supporting articles, comprising a plurality of bars forming a framework of open construction, means on said bars defining a channel which extends throughout the length of said bars and has a constricted channel side opening which opens into a side surface of said bars, said bars having angularly bent longitudinal portions and making angles with each other, some of said portions extending in touching contiguous relation, each pair of the contiguously extending bar portions turning their channel side openings towards one another, and locking means detachably introduced into the channels of each pair of the contiguously extending bar portions and engaging therein under locking action, said locking means extending through the channel side openings from channel to channel, whereby the frame may be readily assembled and disassembled and when assembled presents an appearance in which the locking means are not visible with these side openings in side-by-side alignment.

2. A frame according to claim 1, wherein at least some of said bars are bent into the shape of a U having a web portion and two limb end portions, said limb end portions being interconnected in pairs by the intermediary of said locking means for the formation of frame legs.

3. A frame according to claim 2, wherein one of said bars is bent into the shape of a ring which extends along said web portions of said U-shaped bars and is interconnected with said U-shaped bars by the intermediary of said locking means.

4. A frame according to claim 2, wherein the channel formed in the web of the U-shaped bar engages slidable retaining means for sliding leaves.

5. A frame according to claim 2, wherein the webs of two interconnected U-shaped bars are arranged at different levels.

6. A frame according to claim 2, wherein the two interconnected limbs of two U-shaped bars in the frame together constitute a framing or bracket for an appliance, such as a lighting apparatus, telephone support or the like.

7. A frame according to claim 1, wherein at least some of said bars are bent into the shape of a U having a web portion and two limb end portions, said limb end portions being interconnected in pairs by the intermediary of said locking means for the formation of frame legs, each U-shaped bar having a side surface which is at right angles to the plane of the U-shaped bar and faces outwardly therefrom, said side surface adjoining on one side a bar side surface projecting therefrom approximately at right angles away from said U-shaped bar and adjoining on the other side the bar side surface in which opens the channel side opening.

8. A frame according to claim 1, wherein at least some of said bars are bent into the shape of a U having a web portion and two limb end portions, said limb end portions being interconnected in pairs by the intermediary of said locking means for the formation of frame legs, means on said U-shaped bars defining a groove which opens into a bar side surface facing inwardly of the U-shaped bar.

9. A frame according to claim 1, wherein said bars are individually bent into the shape of a U having a web portion and two limb end portions, the web portions of said U-shaped bars being interconnected by the intermediary of said locking means for the formation of a pedestal which can be placed on a base, supported by the limb end portions projecting from one end of the pedestal.

10. A frame according to claim 1, wherein said bars are individually bent into L-shape and said bars are interconnected at their one L-arm by the intermediary of said locking means for the formation of a pedestal from one end of which extend the other L-arms of said bars in different directions.

* * * * *